(12) United States Patent
Gozikowski

(10) Patent No.: US 6,679,247 B1
(45) Date of Patent: Jan. 20, 2004

(54) SOLAR WATER HEATING

(76) Inventor: David T. Gozikowski, R.R. #1, Box 279, Falls, PA (US) 18615

( * ) Notice: Subject to any disclaimer, the term of this patent is extended or adjusted under 35 U.S.C. 154(b) by 0 days.

(21) Appl. No.: 10/145,670

(22) Filed: May 15, 2002

Related U.S. Application Data
(60) Provisional application No. 60/291,387, filed on May 16, 2001.

(51) Int. Cl.[7] ............................. E04D 13/18; F24J 2/36
(52) U.S. Cl. ...................... 126/621; 126/624; 126/633
(58) Field of Search ................................ 126/621, 583, 126/617, 628, 633, 634, 624

(56) References Cited

U.S. PATENT DOCUMENTS

| | | | | |
|---|---|---|---|---|
| 4,000,850 A | * | 1/1977 | Diggs ........................ 126/613 |
| 4,191,168 A | * | 3/1980 | Allen et al. ................ 126/648 |
| 4,408,596 A | * | 10/1983 | Worf ......................... 126/630 |
| 5,954,046 A | * | 9/1999 | Wegler ...................... 126/617 |
| 6,220,339 B1 | * | 4/2001 | Krecke ...................... 126/621 |

* cited by examiner

Primary Examiner—Alfred Basichas
(74) Attorney, Agent, or Firm—Steven R. Petersen; Steve Mendelsohn

(57) ABSTRACT

Solar water heaters may include a solar collector in a decorative structure, and solar collectors comprising a coil of tubing are adapted to be disposed in a decorative structure such as a wishing well. In one embodiment, a solar water heating system comprising a decorative structure and a coil of tubing disposed within the decorative structure, the coil having a helical shape and being oriented with its axis disposed generally vertically. In another embodiment, a method comprises the steps of providing a coil of tubing, the coil having an axis and the tubing of the coil being radially spaced from the axis; disposing the coil in a location receiving sunlight with the coil axis oriented generally vertically; and causing fluid to flow through the coil. In another embodiment, a method of making a solar collector for a solar water heating system comprises the steps of providing a supply of flexible tubing and a frame; securing a portion of the tubing to the frame; and rotating the tubing supply and the frame relative to one another so as to dispose a portion of the tubing in successive turns around the frame to form a coil.

39 Claims, 10 Drawing Sheets

US 6,679,247 B1

SOLAR WATER HEATING

CROSS-REFERENCE TO RELATED APPLICATION

This nonprovisional U.S. national application, filed under 35 U.S.C. §111(a), claims, under 35 U.S.C. §119(e)(1), the benefit of the filing date of provisional U.S. national application no. 60/291,387, filed under 35 U.S.C. §111(b) on May 16, 2001 as, the teachings of which are incorporated herein by reference.

BACKGROUND OF THE INVENTION

1. Field of the Invention

The present invention relates to solar water heating. This invention relates to solar water heating systems, including systems having solar collectors embodied in decorative structures. This invention also relates to methods of making solar water heaters and methods of heating water using solar energy.

2. Description of the Related Art

Solar water heating systems typically include a solar collector having a collecting surface that AS may be exposed to sunlight and a supply of water to be heated that is thermally coupled to the collecting surface. A portion of the sunlight impinging on the collecting surface is absorbed by it and raises its temperature; heat flows from the collecting surface into the water supply by conduction. The collecting surface is typically an exterior surface of a length of metal pipe that is filled with water to be heated. The length of pipe is often disposed in a serpentine path in a planar rectangular configuration in order to provide a relatively large collecting surface for the solar collector. Typically the heated water is circulated from the solar collector to some other location where the heated water, or the heat of the heated water, is to be used. Solar water heating systems are often configured with a solar collector disposed on the roof of a house or other building, and water is circulated between the collector and the interior of the building where the heated water may be used for space heating or a part of the building's hot water supply. The amount of energy that can be received by a planar solar collector disposed in a fixed orientation is a strong function of time of day, peaking at local noon and falling sharply to zero no more than six hours earlier and later, assuming that the collector is oriented with its normal directed toward the meridian.

The design of solar collectors is usually dictated more by functional than aesthetic considerations. Locating a residential solar collector on the roof of a house rather than on the lawn adjacent the house may have a practical benefit in avoiding the solar collector being shadowed, or in using an existing structure to support the solar collector. However, the aesthetic consequence of such location may be merely to display an eyesore prominently on the roof instead of devoting lawn space to it.

BRIEF SUMMARY OF THE INVENTION

Whereas prior art solar water heaters have apparently given little consideration to aesthetics, embodiments of the present invention are suited to inclusion of a solar collector in a decorative structure. In one embodiment, the present invention is a solar water heating system comprising a decorative structure and a coil of tubing disposed within the decorative structure, the coil having a helical shape and being oriented with its axis disposed generally vertically. In another embodiment, the present invention is a method comprising the steps of providing a coil of tubing, the coil having an axis and the tubing of the coil being radially spaced from the axis; disposing the coil in a location receiving sunlight with the coil axis oriented generally vertically; and causing fluid to flow through the coil. In another embodiment, the present invention is a method of making a solar collector for a solar water heating system comprising the steps of providing a supply of flexible tubing and a frame; securing a portion of the tubing to the frame; and rotating the tubing supply and the frame relative to one another so as to dispose a portion of the tubing in successive turns around the frame to form a coil.

BRIEF DESCRIPTION OF THE DRAWINGS

The foregoing and other aspects, features, and advantages of the present invention will become more fully apparent from the following detailed description, the appended claims, and the accompanying drawings in which:

DETAILED DESCRIPTION

Solar water heaters in accordance with the present invention may be embodied in decorative structures. One type of decorative structure that is commonly found in residential settings is the wishing well. Wishing wells include a generally tubular (e.g., cylindrical) bottom portion, evoking the wall that traditionally has been constructed around the opening of a water well. Supported above and spaced apart from the generally tubular bottom portion is a tapering (e.g., conical) structure evoking the roof that was traditionally provided to cover the opening of a water well. Frequently a simulated crank-operated bucket-lowering structure is included to complete the appearance of a traditional water well.

Solar water heaters according to certain embodiments of the present invention are adapted to be embodied in a wishing well structure, thus providing a decorative solar water heating system that, rather than detracting from a home's appearance, may enhance it. A wishing well solar water heater in accordance with the present invention includes a base portion and a roof portion supported above and spaced apart from the base portion. The base portion or the roof portion, or both, includes a coil of tubing through which water may be passed, the coil(s) being disposed so as to be at least partly exposed to the sun.

Figure 1:
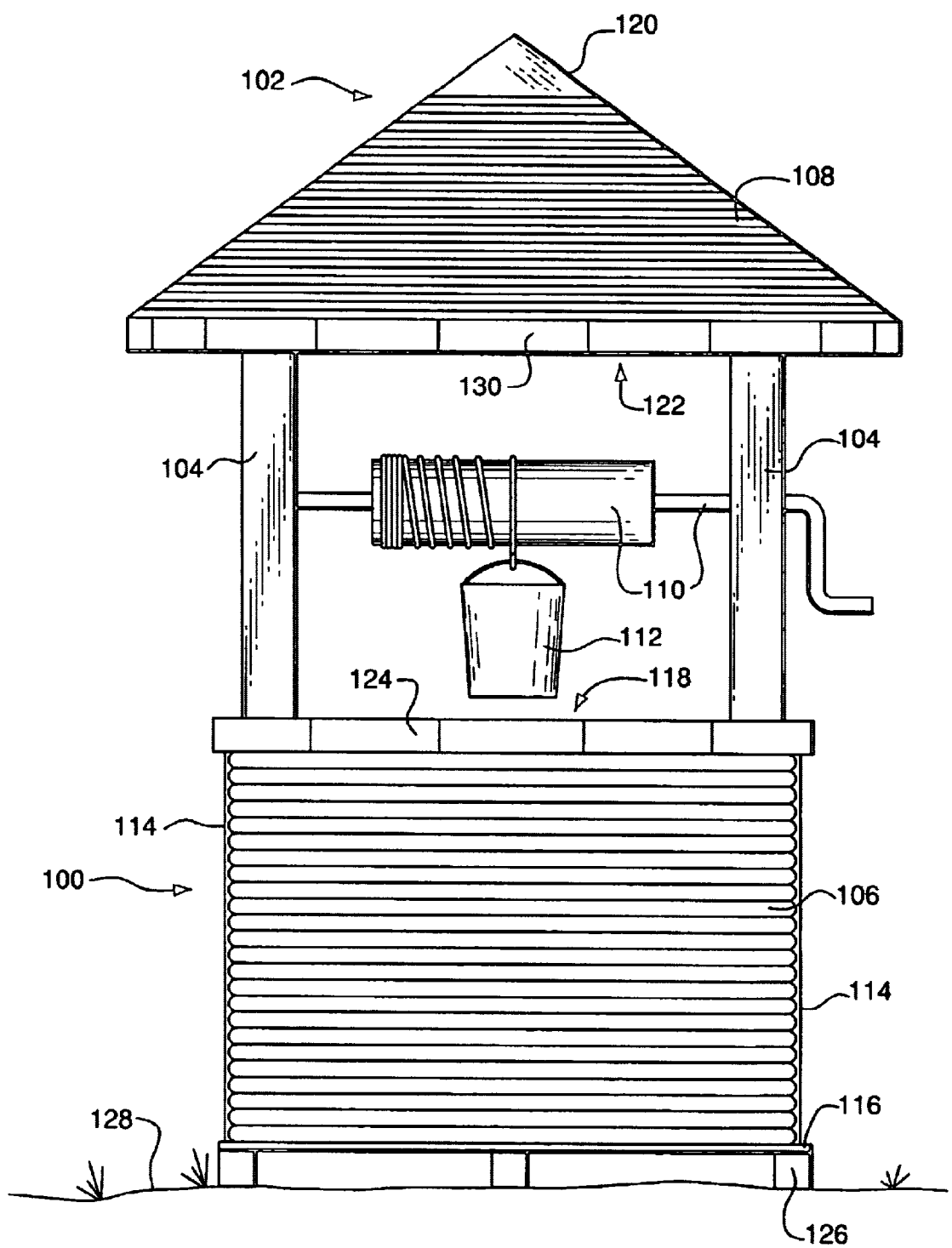
FIG. 1 is a side view of a first embodiment of a solar water heater in accordance with the invention.

FIG. 1 is a front elevation of a first embodiment of a solar water heater in accordance with the invention. The solar water heater includes a base portion 100 and a roof portion 102 that is supported above base portion 100 by supports 104. Base portion 100 includes a coil 106 of tubing through which water may be passed. Coil 106 is disposed with its axis oriented generally vertically, in a manner such that at least part of coil 106 may be exposed to sunlight if the solar water heater is located in an open outdoor area, thereby acting as a solar collector. Roof portion 102 includes a coil 108 of tubing through which water may be passed. Coil 108 is disposed with its axis oriented generally vertically, in a manner such that at least part of coil 108 may be exposed to sunlight if the solar water heater is located in an open outdoor area, thereby acting as a solar collector. Decorative elements simulating a windlass 110 and a bucket 112 may be provided to contribute to the appearance of a traditional water well. Other decorative elements that may be provided include wooden trim 124 around the top 118 of base portion 100 and wooden trim 130 around the bottom 122 of roof portion 102. These wood trim components are shown as a plurality of segments to follow a curve such as the curve around the bottom of roof portion 102 and the curve around the top of base portion 100.

Preferably, the tubing of a solar collector is disposed in a structure that inhibits heat that has been collected from being lost by conduction and convection. In the first solar water heater embodiment, coils 106 and 108 are disposed in closed structures that thermally insulate the coils from the ambient air and permit incident sunlight to reach the coils. The insulating structure for coil 106 includes a sheet 114 of transparent material disposed radially outwardly and preferably spaced apart from coil 106, a planar member 116 closing off the bottom of base portion 100, and elements not shown in FIG. 1 that close off the top 118 of base portion 100. The insulating structure for coil 108 includes a sheet 120 of transparent material disposed radially outwardly from coil 108 and elements not shown in FIG. 1 that close off the bottom 122 of roof portion 102. Blocks 126 may be provide to support the wishing well solar water heater above the surface 128 of the ground.

Figure 2:
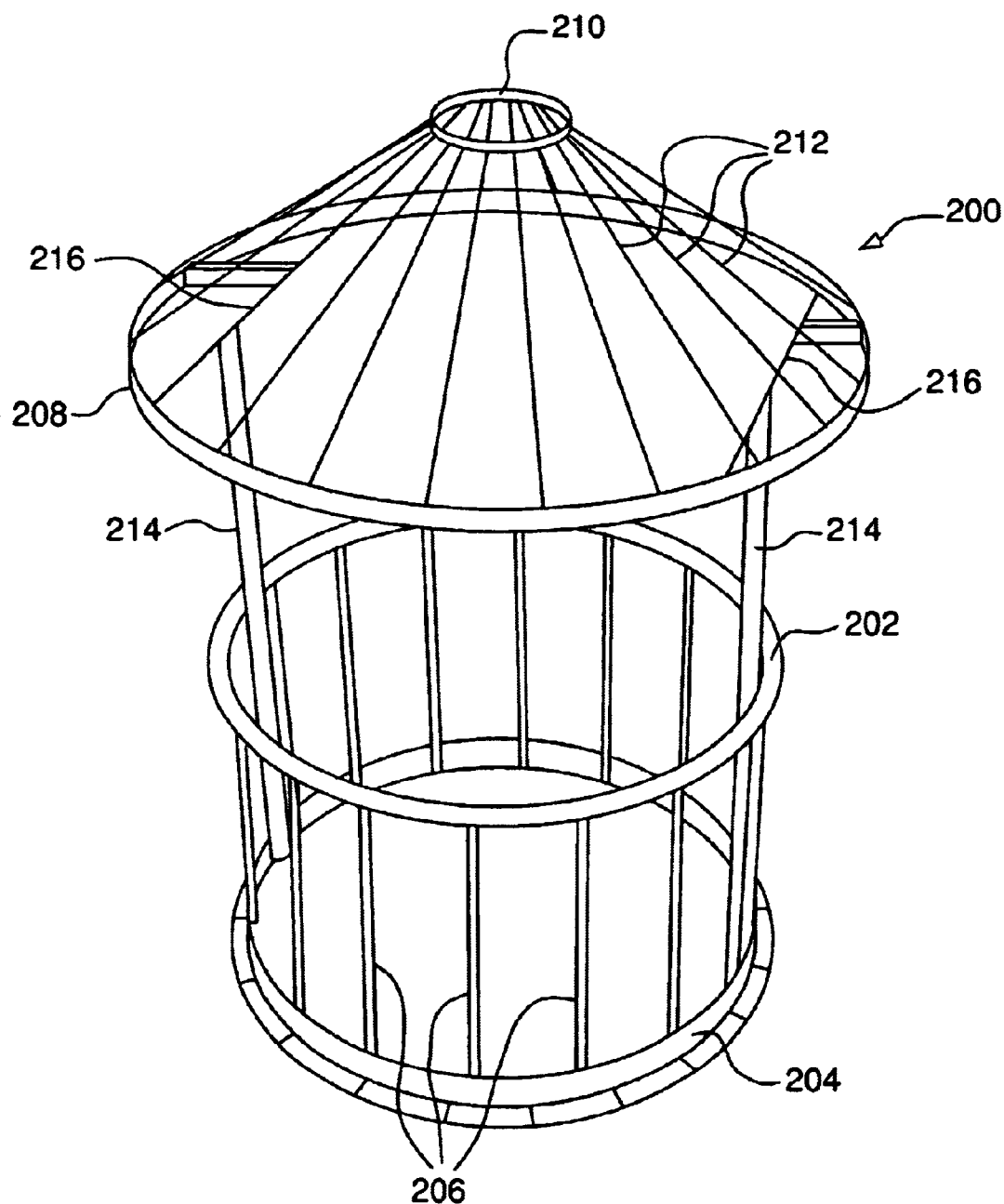
FIG. 2 is a perspective view of a frame that may be used in a solar water heater in accordance with the invention.

Some structural support is required to maintain a solar collector tubing coil in its desired configuration, and Applicant prefers a steel frame for this purpose. FIG. 2 is a perspective view of a frame 200 that may be used in a solar water heater in accordance with the invention. A base portion frame includes spaced-apart circular members 202 and 204; longitudinally-extending stiles 206 are secured at their ends to circular members 202 and 204. The base portion frame has the general shape of a hollow cylinder. A roof portion frame includes spaced-apart circular members 208 and 210; ribs 212 are secured at their ends to circular members 202 and 204. The roof portion frame has the general shape of a hollow truncated cone. Each of a pair of T-shaped supports, consisting of a vertical member 214 and a horizontal member 216, has its vertical member 214 secured to the base portion frame and its horizontal member 216 secured to the roof portion frame. The frame components are preferably made of steel angle stock, although flat stock can be used, and are welded together to form the frame. If angle stock is used to form circular members 202 and 204, it is desirably slit along its surface extending in the horizontal plane to permit it to be bent into a circular shape, and once so bent, it may be stiffened with gussets that may be welded at intervals around the radially-inward surface of circular members 202 and 204. Other materials could be used to make a frame as depicted in FIG. 2, such as wood and plastic, but considerations of expense and strength, particularly when a rather substantial volume of water is to be held within a solar water heater structure, counsel use of steel.

Figure 3:
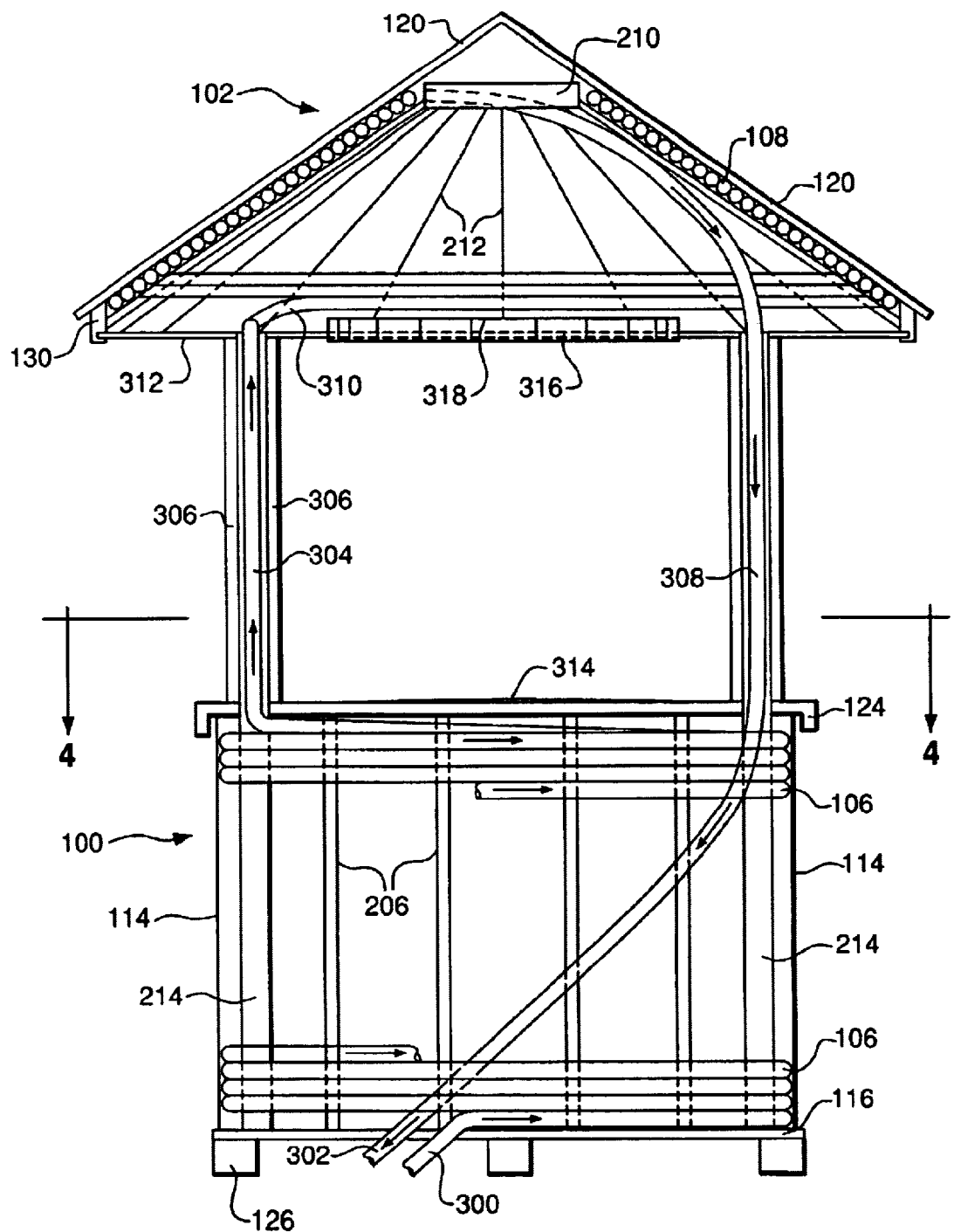
FIG. 3 shows a side view of the solar water heater of FIG. 1 that is partially cut-away and partly in cross-section.

FIG. 3 shows a side view of the solar water heater of FIG. 1 that is partially cut-away and partly in cross-section. In FIG. 3, the preferred water flow through the solar water heater is illustrated. The water inlet 300 to the solar water heater may be a section of the tubing of which coil 106 is formed. Water introduced into water inlet 300 flows helically upwardly through coil 106, exiting at the top and entering tubing section 304 which connects coil 106 and coil 108. Tubing section 304 is conveniently disposed along one of the supports 104 shown in FIG. 1. As shown in FIG. 3, wooden trim 306 encases steel vertical member 214 to form supports 104 shown in FIG. 1, and tubing section 304 may be disposed in a hollow formed within the casing, such as will occur when vertical member 214 is formed from steel angle stock. Water exiting tubing section 304 enters the bottom of coil 108 and flows helically upwardly through it, exiting at the top. Due to flexibility limitations in coiling the tubing material, the cone shape of coil 108 is truncated at the top. Water exiting coil 108 enters tubing section 308 which extends from the top of coil 108 to water outlet 302. Tubing section 308 is also conveniently disposed along one of the supports 104, and may be disposed in the hollow formed in a support 104 as previously described. Water inlet 300 and water outlet 302 tubing sections may be brought out of the solar water heater through holes in planar member 116, which may be made of pressure-treated plywood, covering the bottom of base portion 100.

Convection will tend to move heat upwardly through the coils. By directing the water flow through solar water heater from bottom to top, the hottest water will typically be drawn from water outlet 302.

A solar water heater in accordance with the present invention may be used for many purposes. It may act as a pre-heater for a conventional domestic electric or gas hot water heater, in which case water inlet 300 will be connected to the cold water supply and water outlet 302 will be connected to the inlet of a domestic hot water heater, such as a conventional gas or electric hot water heater. A solar water heater in accordance with the present invention may act as a pool heater, in which case water inlet 300 will be connected to a source of water removed from the pool, such as the outlet of a pool filter, and water outlet 302 will directed to return heated water to the pool.

Figure 6B:
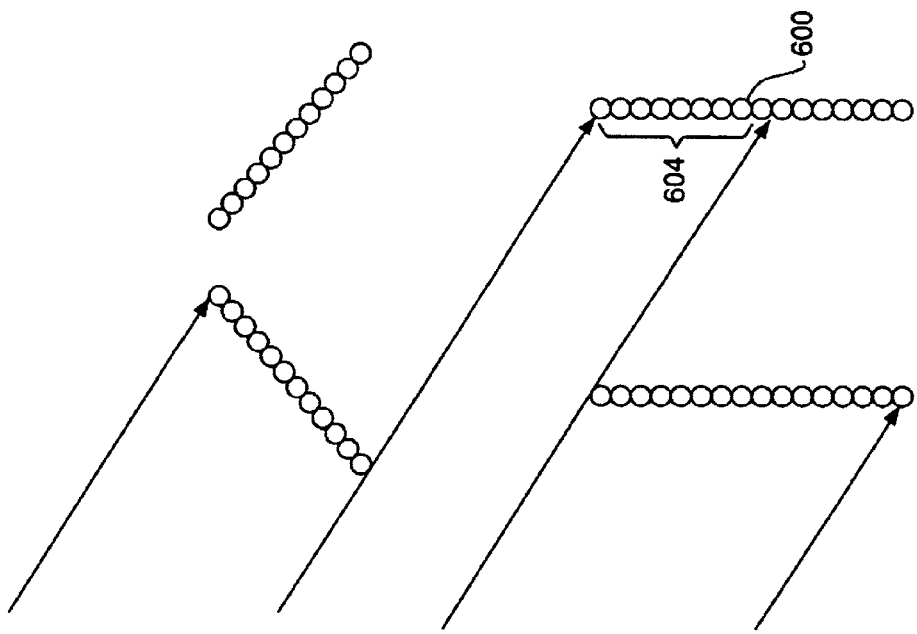
FIGS. 6a and 6b are schematic diagrams illustrating the illuminating of solar water heater coils at various sun elevations.

Sheets 120 and sheet 114 are desirably made of transparent plastic. Applicant has found 0.118" thick polycarbonate sheet to be a suitable material. A transparent plastic material is also desirable to use for cover 314, which closes off the top of base portion 100 to form a closed space and thereby insulate coil 106. The reason for this is illustrated in FIGS. 6a and 6b.

Figure 6A:
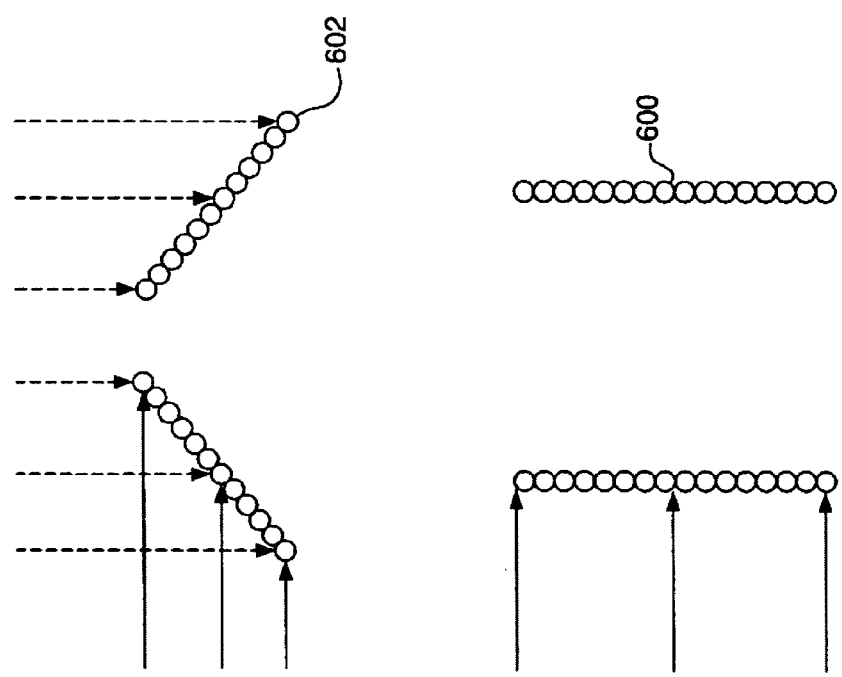

FIG. 6a shows schematically a tubular lower coil 600 and a tapering upper coil 602, disposed as coils 106 and 108 are. FIG. 6a represents, by solid arrows, the incidence of sunlight on the coils at sunrise or sunset. The left half of each coil is illuminated, and the right half is in shadow; half the length of tubing in each coil is illuminated. FIG. 6a represents, by dashed arrows, the incidence of sunlight on the coils with the sun at zenith. The upper coil 602 is fully illuminated, and lower coil 600 is in shadow. When the sun is at an intermediate elevation, as shown in FIG. 6*b*, the left half of lower coil 600 is illuminated, at least half of upper coil 602 is illuminated, and a part 604 of the inner surface of lower coil 600 is also illuminated. With reference to FIG. 3, by making cover 314 out of a transparent material, some of the sunlight incident on base portion 100 that otherwise would not contribute to water heating is made to impinge on coil 106 by enabling it to encounter the radially-inward surface of coil 106. In accordance with an aspect of certain embodiments of the present invention, a solar collector coil is disposed so that both its radially-inward surface and its radially-outward surface may be exposed to sunlight during the course of a day. As may be seen in FIGS. 6*a* and 6*b*, a substantial area of the solar collector coils is illuminated from sunrise to sunset, and water heating throughout the day will be more constant with solar collectors as described herein than with fixed planar solar collectors.

Figure 4:
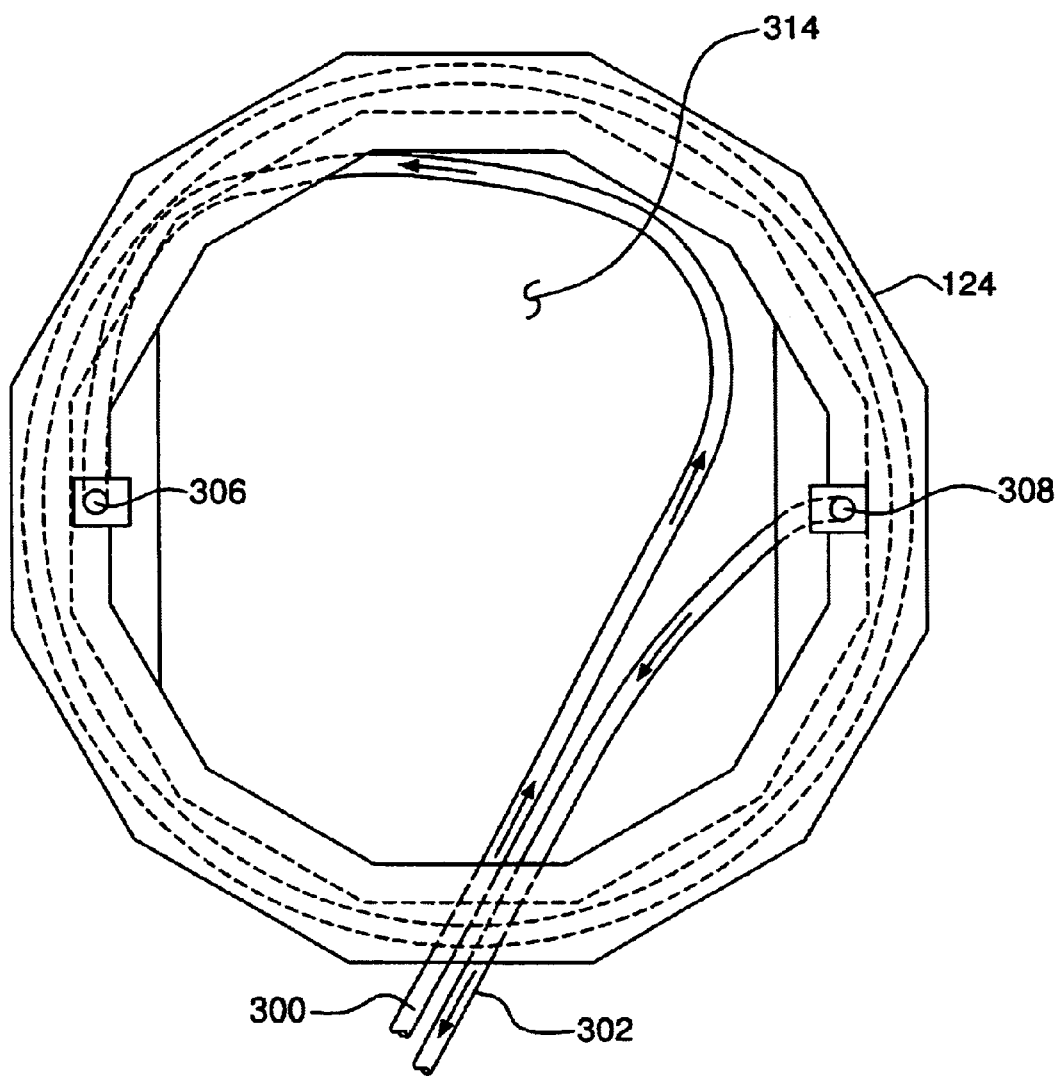
FIG. 4 is a view of the solar water heater of FIG. 3 taken perpendicular to the line 4—4 showing a plan view of the base portion.
Figure 5:
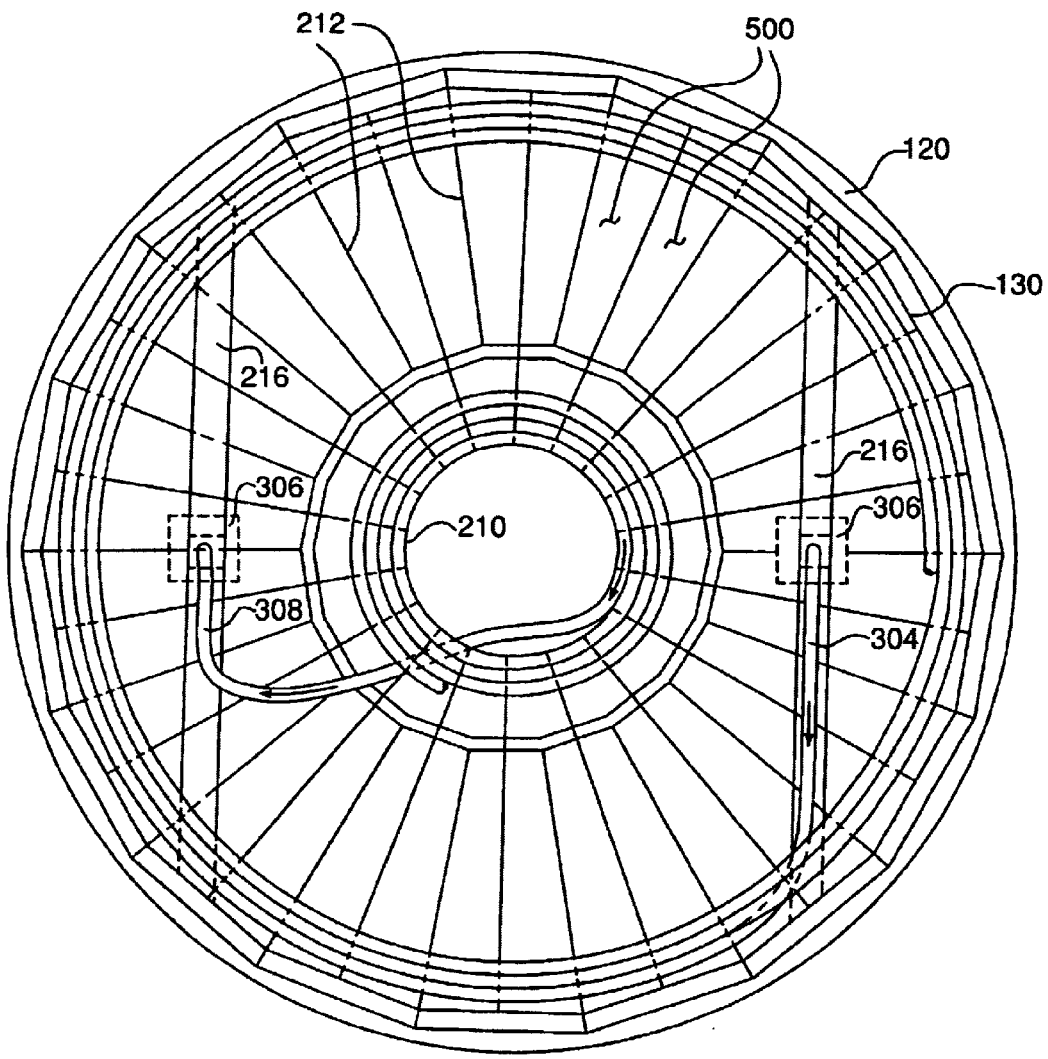
FIG. 5 is a plan view of the solar water heater of FIG. 3 showing the roof portion.

FIG. 4 is a view of the solar water heater of FIG. 3 taken perpendicular to the line 4—4 showing a plan view of the base portion, and FIG. 5 is a plan view of the solar water heater of FIG. 3 showing the roof portion. These figures may assist in understanding the first embodiment of the invention. As seen in FIG. 5, the floor 312 of FIG. 3 that closes off the bottom of roof portion 102 may be made from a circular array of wedge-shaped wooden trim pieces 500. Referring again to FIG. 3, a circular opening in the center of floor 312 may be surrounded by wooden trim 316 and closed off by a transparent sheet to provide a "skylight" 318. Sunlight passing through the conical apex area of sheet 120 can also pass through skylight 318 and illuminate a coil in base portion 100, thereby contributing to heating. Skylight 318 also enables the interior of roof portion 102 to be inspected. Larger sizes of solar water heaters may be provided with relatively larger openings in circular member 210 and larger skylights 318, relatively enhancing such contribution.

Applicant's preferred tubing material for coil 106 and coil 108 is polymeric tubing, and particularly, plastic pipe of the sort that is sold for use in wells. Such well pipe, which may be made of polyethylene or PVC, is relatively inexpensive, is suitable for use in domestic water systems, is relatively flexible, and is supplied in long lengths on spools which are easy to use in making solar collectors of the sort described herein. Such well pipe is typically black in color, which is advantageous for solar energy absorption. Such well pipe is relatively resistant to cracking upon freezing.

To maximize the collecting area of a solar collector coil, the turns of the coil are desirably spaced closely adjacent one another. The volume of water contained within the solar water heater affects its operation in several ways. For a given coil area exposed to sunlight, the greater the volume of water that is contained within the coil, the more slowly it heats but, once heated, the greater the available supply of hot water will be. Although larger and smaller sizes can be used, Applicant has found 1", 160 p.s.i. well pipe to be a suitable coil material in terms of flexibility and water volume contained in coils used in solar water heaters configured as wishing wells.

Figure 7:
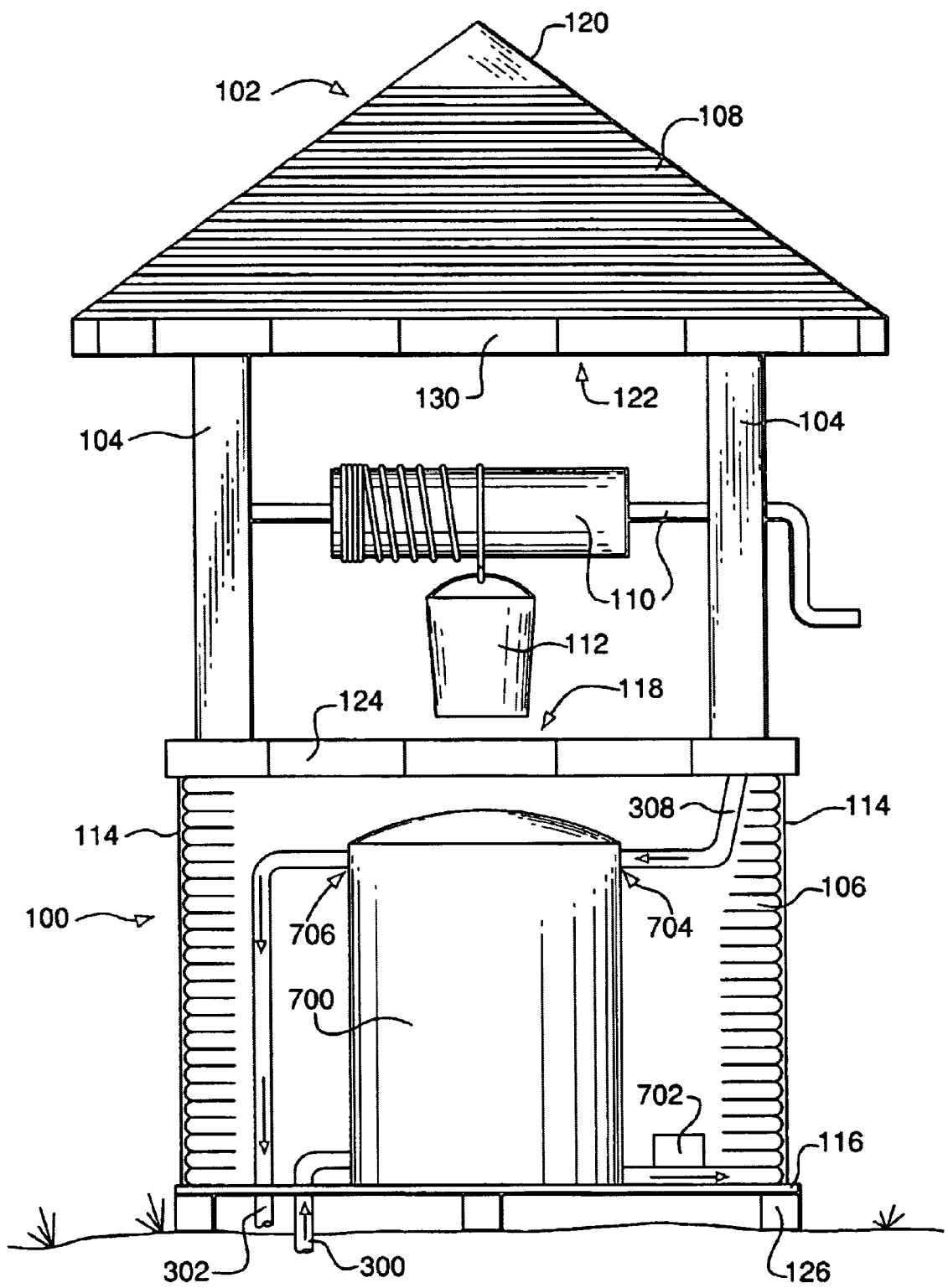
FIG. 7 is a side view of a second embodiment of a solar water heater in accordance with the invention which includes a tempering tank, partially cut away to show the tempering tank.

FIG. 7 is a side view of a second embodiment of a solar water heater in accordance with the invention which includes a tempering tank, partially cut away to show the tempering tank 700. A tempering tank may be used to increase the volume of water heated by the solar water heater that can be stored for later use. The interior of base portion 100 provides a convenient place to put a tempering tank, although external tempering tanks may also be used. Water flow into the system of FIG. 7 is from water inlet 300 into an inlet port in the lower portion of tempering tank 700. Water flows from an outlet port in the lower portion of tempering tank 700 into the bottom of coil 106, whereupon it flows through coil 106 and coil 108 as previously described. Tubing section 308 carrying water from coil 108, instead of being directly coupled to water outlet 302, is coupled to an inlet 704 of tempering tank 700. Solar water heater water outlet 302 is coupled to outlet 706 of tempering tank 700. A pump 702 is provided to circulate water from the tempering tank 700 through coil 106 and coil 108. Pump 702 may be activated by a timer or thermal switch. The circulating loop provided from tempering tank 700 through coil 106 and coil 108 and back into tempering tank 700 driven by pump 702 enables a relatively large volume of water to be heated and stored so as to be available for later use.

Figure 8:
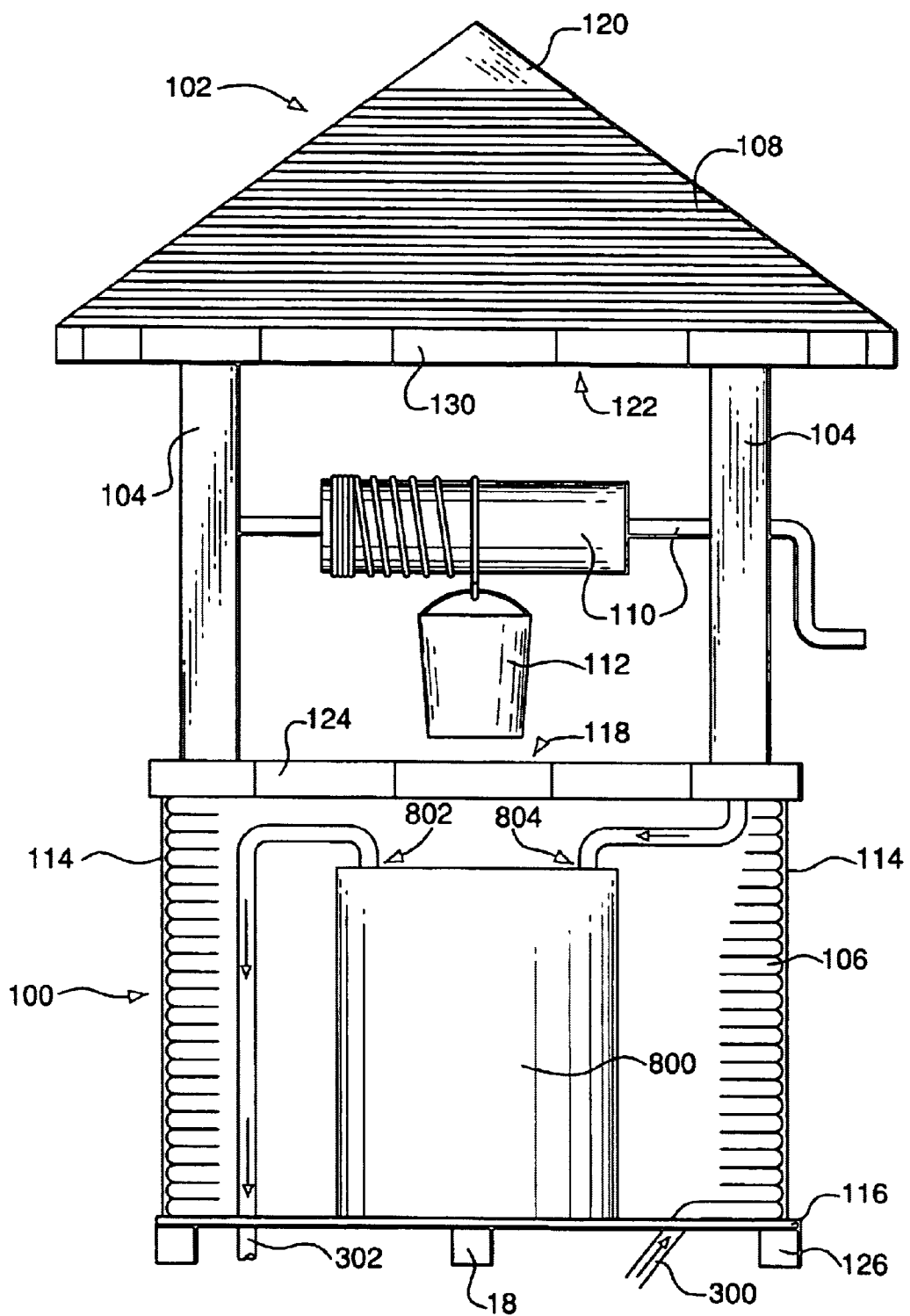
FIG. 8 is a side view of a third embodiment of a solar water heater in accordance with the invention, partially cut away to show an active water heater in the base portion.

FIG. 8 is a side view of a third embodiment of a solar water heater in accordance with the invention, partially cut away to show an active water heater in the base portion. Solar water heaters may be characterized as passive water heaters; they only heat water when the sun happens to shine on them. As has been noted, a solar water heater of the present invention may be used as a preheater for a conventional active water heater, such as a gas or electric water heater. While a conventional active water heater may be located remotely from the solar water heater of the present invention, for instance in a utility closet or basement within a dwelling as they typically are installed, an active water heater may also be disposed within base portion 100, and such an arrangement is shown in FIG. 8. Tubing section 308 receiving hot water from coil 108 is coupled to inlet 804 of active water heater 800. Active water heater 800 is preferably an electric water heater, although a gas water heater might be used if appropriate steps are taken to supply air and vent combustion gases. The outlet 802 of water heater 800 is connected by a section of tubing to water outlet 302.

An assembly like that of FIG. 8, including a solar water heater and an active water heater, may have several advantages. For instance, it may save space in a home, by enabling the active water heater to be placed outdoors rather than in the living space of the home. Since active water heaters are prone to leakage and failure, removing the active water heater from the home's living space may avoid water damage upon leakage or failure of the active water heater.

Figure 9:
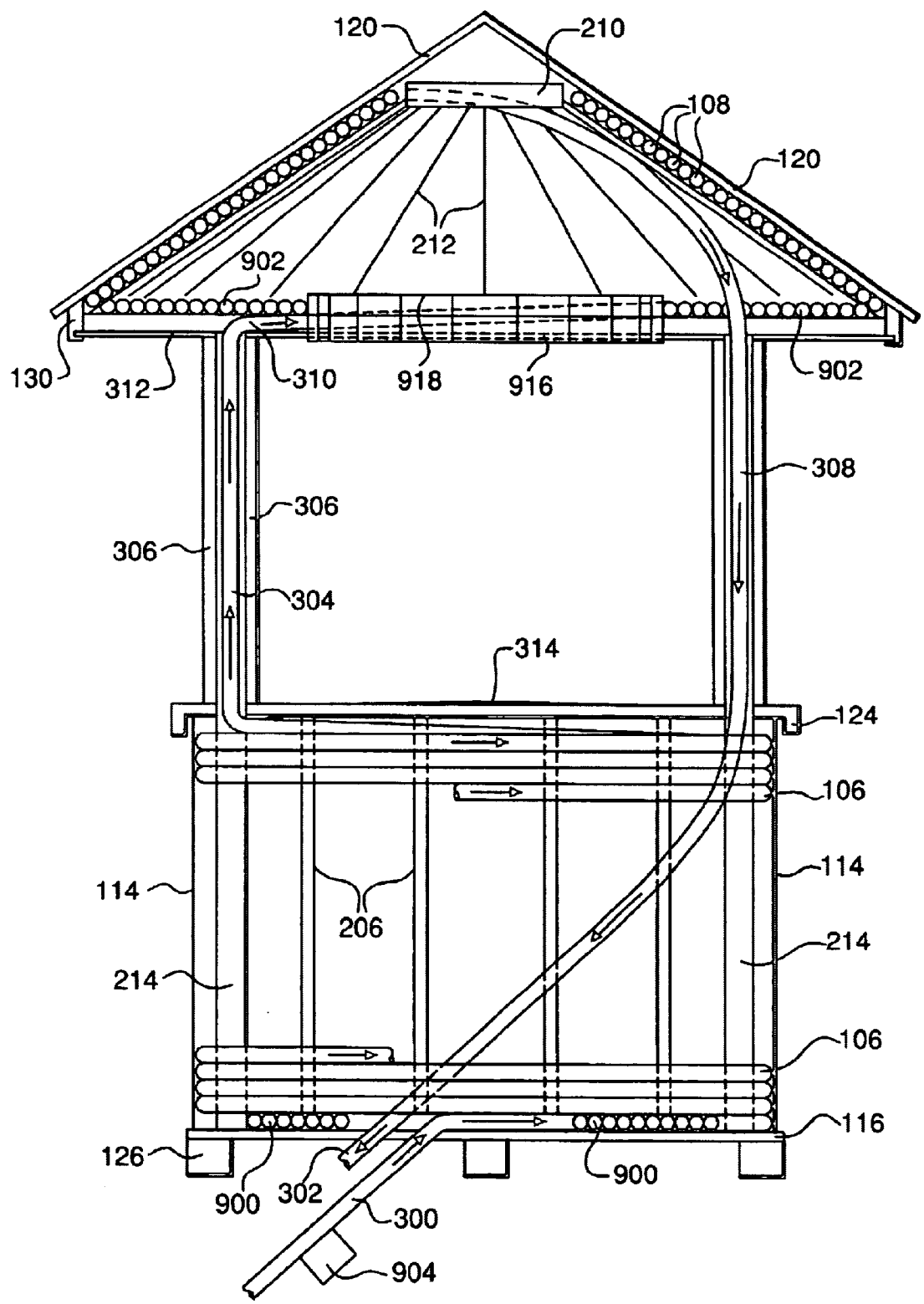
FIG. 9 shows a side view of a fourth embodiment of a solar water heater in accordance with the invention that is partially cut-away and partly in cross-section.

FIG. 9 shows a side view of a fourth embodiment of a solar water heater in accordance with the invention, that is partially cut-away and partly in cross-section. The fourth embodiment view shown in FIG. 9 is similar to the first embodiment view shown in FIG. 3. The principal difference between these embodiments is the addition of planar coil 900, disposed on the bottom of base portion 100, and the addition of planar coil 902, disposed on the floor of roof portion 102, in the embodiment shown in FIG. 9. These coils are planar, horizontally-disposed coils, and they provide increased water volume in a solar water heater and also can contribute to some degree to heating. Water flow in the system of FIG. 9 is from water inlet 300 to the inner turn of planar coil 900, spiraling outwardly to the periphery of coil 900, then upwardly through coil 106, exiting coil 106 and flowing upwardly through tubing section 304, then through tubing section 304 to the inner turn of planar coil 902, spiraling outwardly to the periphery of coil 902, then upwardly through coil 108, exiting coil 108 at the top thereof and flowing downwardly through tubing section 308, to water outlet 302. Coil 902 can be partially illuminated by sunlight passing through the conical apex area of sheet 120 and the opening in circular member 210; coil 900 can be partially illuminated by sunlight passing through an opening in cover 314. A solar water heater such as that of the first embodiment can be augmented by addition of either coil 900 or coil 902, or both.

Figure 10:
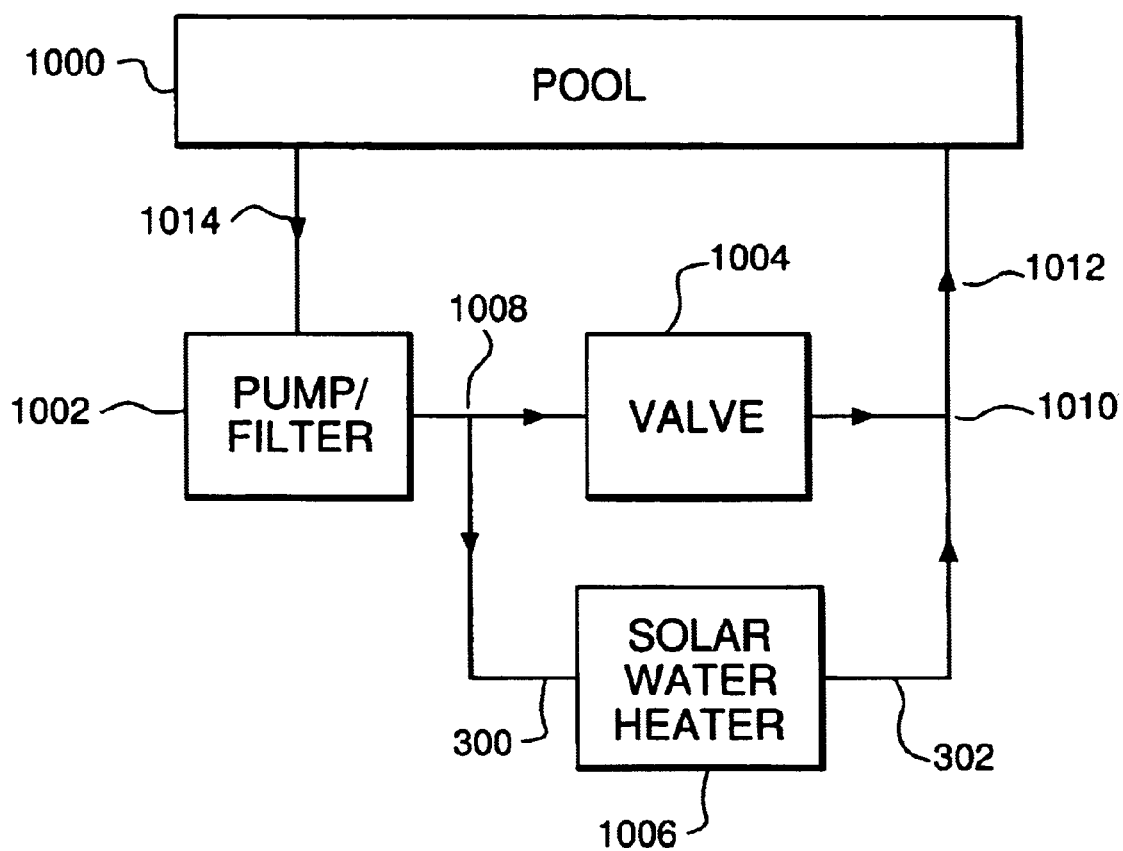
FIG. 10 is a block diagram of an embodiment of a pool heating system in accordance with the invention.

In some water heating applications, it may be desirable to provide a pump 904 to pump water through the solar water heater. Pump 904 may be a low volume, high pressure pump. In other applications, such as many pool heating applications, it is possible to use a pump that already exists in the application to pump water through the solar water heater instead of providing a separate pump. FIG. 10 shows such an application.

FIG. 10 is a block diagram of an embodiment of a pool heating system in accordance with the invention. In a typical pool filtration system, water 1014 is removed from a pool 1000 and filtered by a pump/filter 1002, and the filtered water is returned to pool 1000. In the embodiment shown in FIG. 10, a valve 1004 and a pair of tees 1008, 1010 are placed in the pipe that returns filtered water to pool 1000. Water inlet 300 of a solar water heater 1006 is coupled to tee 1008, and water outlet 302 of solar water heater 1006 is coupled to tee 1010. The pressure drop caused by flow through valve 1004 creates a pressure differential across solar water heater 1006 and causes a portion of the return flow to be directed through solar water heater 1006. The heated flow through solar water heater 1006 and the unheated flow through valve 1004 provide the return flow 1012 and, as shown in FIG. 10, may return to pool 1000 in a common pipe. Doing so has the advantages of avoiding very hot water being introduced into the pool, and of enabling use of much of the piping of an existing pool system. Alternatively, the heated flow through solar water heater 1006 and the unheated flow through valve 1004 may be returned to pool 1000 separately.

A relatively small pressure drop, e.g., a few p.s.i., may be adequate to direct an appropriate portion of return flow 1012 through solar water heater 1006. Such back pressure levels introduced by valve 1004 may be expected to have little effect on the operation of pump/filter 1002. In this regard, the flow paths provided by coils that are generally round in cross-section, such as in a wishing well solar water heater with a cylindrical base coil and a conical roof coil, provide a relatively low flow resistance, which may be a desirable property in certain applications.

Adjusting valve 1004 provides some control over the temperature of return flow 1012 and the heating of the pool. Valve 1004 can be adjusted by hand; for instance, a person can place a hand on a pipe carrying heated water to or from tee 1010 to sense its temperature, and adjust valve 1004 to obtain the desired temperature. Once pool 1000 reaches the desired temperature, valve 1004 can be fully opened to limit water flow through solar water heater 1006. These processes can also be undertaken automatically, for instance, by temperature sensors and valve controllers responsive to the sensed temperatures.

Use of flexible tubing, and a frame such as described with respect to FIG. 2, permits a solar collector coil, or a solar water heater having several such coils, to be made by relatively simple methods. In general, a frame and a supply of tubing may be provided; a portion of the tubing can be secured to the frame; and relative rotation can be imposed between the tubing supply and the frame, so as to dispose tubing from the supply around the frame as a coil. Preferably, the tubing supply is disposed on a spool containing a sufficient length of tubing to create a coil of desired dimensions. A particularly preferred method of imposing relative rotation is to mount the frame for rotation, such as on a carousel, a lazy susan, or a turntable-like apparatus. The tubing supply is preferably on a spool mounted for rotation about the spool axis. A free end of tubing may be drawn from the spool and secured to the frame. The frame may then be rotated so as to draw tubing from the supply spool and wind it around the frame in successive turns to form a coil. The trailing end of the tubing may be cut from the supply and secured to the frame to complete the coil structure. Alternatively, but less preferably, the frame may be maintained in a fixed position and the tubing supply may be rotated around the frame axis to wind tubing around the frame to form a coil.

A tubular frame like the base portion frame (202, 204, and 206) of FIG. 2, or a tapering frame like the roof portion frame (208, 210, and 212) of FIG. 2, can be rotated and a tubing coil disposed on it as described. An entire frame like that of FIG. 2, including both a tubular frame portion and a tapering frame portion, can also be rotated so as to dispose tubing coils on the base portion and roof portion. In that case, it is preferred to wind the base portion coil and the roof portion coil separately, and then connect them. A two-coil solar water heater like that of the first, second, and third embodiments of the present invention, or a four-coil solar water heater like that of the fourth embodiment of the present invention, can be made with as few as one or two joints in the flow path within the solar water heater. Since joints are a source of potential leakage and/or failure, it is desirable to minimize the number of joints. Referring to FIG. 3, the assembly may be made with only a single joint; the tubing section 304 may comprise the tail end of the tubing supply remaining after winding coil 106, which may be fed through a support 104 and joined to the bottom end of coil 108 at 310. Alternatively, tubing section 304 may be a discrete section of tubing, joined at its upper end to coil 108 and joined at its lower end to coil 106. It is also possible, although likely to be much more cumbersome, to wind all of the coils from a single length of tubing without any joints. Wooden trim 916, shown in FIG. 9, desirably extends sufficiently above floor 312 to function as as spool around which coil 902 may be wound.

The preferred embodiments shown herein have coils that are generally radially symmetric, i.e., the cross-sections of which are generally circular in cross-section. Such structures are desirable for ease of fabrication, since when a length of tubing with some stiffness such as well pipe is wound around a frame, it naturally tends to assume a coiled form with a generally circular cross-section. However, it should be understood that the present invention is not limited to such radially-symmetric structures. For instance, base portion 100 could include a coil made by winding tubing around a tubular frame having an oval, square, rectangular, or other cross-section, in which case the resulting coil would be a tubular coil having a generally oval, square, or rectangular cross-section. Also, roof portion 102 could include a coil made by winding tubing around a tapering frame having a cross-section other than a circle. For instance, the roofs of many structures have a shape defined by a pair of intersecting planes, with the line defined by the intersection of the planes forming the peak of the roof. In accordance with the present invention, the frame of the roof portion could define such a pair of intersecting planes, and tubing could be wound around such a frame to provide a coil, each successive turn of which would be somewhat rectangular and generally of the same longitudinal length but smaller width than the turn below. Similarly, the frame of the roof portion could be pyramidal, and tubing could be wound around such a frame to provide a coil, each successive turn of which would be somewhat square and of somewhat smaller area than the turn below.

The present invention includes structures having shapes that may provide advantages when used for purposes consistent with the invention and that have been described herein using certain terminology. Accordingly, it may be helpful to set forth some parameters relating to the shapes that have been discussed herein, particularly with respect to the coils that comprise solar collectors in structures according to the present invention.

As used herein, a "tube" or a "tubular" structure is a structure which defines an axis, and which has or defines a surface that is radially displaced from the axis, in which the cross-section of the surface may be of any shape but is generally constant along its axis. Thus, as used herein, a "tube" or a "tubular" member may be of round, oval, square, rectangular, or any other shape in cross-section so long as the shape and size is fairly constant along the length of the tube or tubular member.

In general parlance and in many dictionary definitions, "helix" and "spiral" have various meanings which might apply to the coil structures disclosed herein, many of which overlap. However, "helix" and "spiral" have different nuances that may be helpful in defining Applicant's invention, and so Applicant uses these terms in specific ways in the context of the present invention. Applicant herein uses "spiral" and its formatives in accordance with a somewhat limited definition, to mean a continuous curve comprising multiple turns disposed around a central point or axis, in which successive turns of the curve differ in size. Applicant herein uses "helix" and its formatives in accordance with a broader definition, to mean a continuous curve comprising multiple turns disposed around a central point or axis, in which successive turns of the curve may or may not differ in size. A curve can be a spiral or a helix regardless of the shape of any turn about the central point or axis. Thus, as used herein, every spiral is a helix, but not every helix is a spiral. The shape of coil 106 is a helix but not a spiral because the size of successive turns of tubing is generally constant, and the shape of coil 108 is a spiral and a helix because the size of successive turns of tubing decreases in the upward direction.

Solar water heaters as described herein can be made in a variety of sizes, depending on the heating capacity desired and aesthetic considerations. If greater heating capacity is desired than can be provided by a single solar water heater structure, several solar water heaters can be placed in series or "daisy-chained" to increase capacity. This may be desirable, for instance, in pool-heating applications where a large pool is to be heated.

It is believed that the fluid to be heated by a solar heater as described herein will, as a practical matter in most cases, be water, and that the heated water will be used in some application where the end substance desired to be heated will be water, such as domestic hot water or pool water. However, it should be understood that structures and methods as described herein can just as well be used to heat fluids other than water. This may be the case, for instance, where the heat collected by the solar collector is intended for use in space heating. In such an application, a heat transfer fluid other than water may be preferred. Accordingly, it should be understood that although the foregoing description has referred to the fluid disposed within the solar collectors as "water", the present invention embraces analogous structures and methods in which the heat transfer fluid is a fluid other than water.

The wishing well is a decorative structure that is well suited to inclusion of a solar water heater. Other decorative structures may also incorporate a solar water heater in accordance with the present invention. For instance, barrel-like structures and simulated windmills and lighthouses are decorative structures that often are placed on the grounds of residential properties. Such structures are also well adapted to include coils for solar water heating purposes, and other decorative structures no doubt exist and may be developed which lend themselves to dual-purpose use as decorative structures and solar water heaters.

Other structures that might ordinarily be thought of more as utilitarian structures than decorative structures might also be modified to include solar collectors in accordance with the present invention. Such structures include sheds and other storage structures. Although the base portions of such structures may not be well-adapted to inclusion of a solar collector in the form of a coil, because of the necessity to access the interior of such a structure through a door that might be occluded by such a coil, these structures may include roof portions that are amenable to inclusion of a coil in accordance with the present invention for solar water heating purposes.

Still other structures that are partly decorative and partly utilitarian might also be adapted to include solar collectors in accordance with the present invention. Such structures include gazebos, which may include roof portions that are amenable to inclusion of a coil in accordance with the present invention for solar water heating purposes.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

It will be further understood that various other changes in the details, materials, and arrangements of the parts which have been described and illustrated in order to explain the nature of this invention may be made by those skilled in the art without departing from the scope of the invention as expressed in the following claims.

What is claimed is:

1. A solar water heating system comprising:
    (a) a decorative structure; and
    (b) a coil of tubing disposed within the decorative structure, the coil having a plurality of turns of tubing around and radially spaced from an axis forming a helical shape with turns of tubing being axially displaced from adjacent turns of tubing, and the coil being oriented with its axis disposed generally vertically.

2. The invention of claim 1, wherein the coil is disposed in an insulating structure including a transparent sheet disposed radially outwardly from the coil so that sunlight may pass through the sheet and impinge on the coil.

3. The invention of claim 1, including a plurality of helical coils of tubing, the coils being disposed generally coaxially and spaced apart along their axes.

4. The invention of claim 1, wherein the decorative structure is a wishing well having a base portion and a roof portion, the roof portion being supported above and spaced apart from the base portion, and the coil being disposed within the base portion or the roof portion.

5. The invention of claim 1, wherein the solar water heating system includes a base portion comprising a helical coil and a roof portion disposed above the base portion and comprising a spiral coil, the helical coil and the spiral coil being coupled so that water flowing through one coil will flow through the other coil.

6. The invention of claim 5, wherein the helical coil and the spiral coil are each disposed in an insulating structure that includes a transparent sheet disposed radially outwardly from the coil so that sunlight may pass through the sheet and impinge on the coil, wherein each coil comprises a length of polymeric well pipe wound around a welded steel frame, and wherein the structure is configured to permit sunlight to impinge on a radially outwardly disposed surface and a radially inwardly disposed surface of a coil.

7. The invention of claim 1, further comprising a tempering tank disposed within and coupled to the coil.

8. The invention of claim 1, further comprising an active water heater disposed within and coupled to the coil.

9. The invention of claim 1, wherein the structure is configured to permit sunlight to impinge on a radially outwardly disposed surface and a radially inwardly disposed surface of the coil.

10. The invention of claim 1, wherein the coil includes a tubular portion in which adjacent turns have generally the same size and shape.

11. The invention of claim 10, further comprising a tempering tank or an active water heater disposed on the coil axis within and coupled to the coil.

12. The invention of claim 1, wherein the coil includes a tapering portion in which adjacent turns have generally the same shape and differ in size.

13. The invention of claim 4, wherein the coil includes a generally cylindrical portion disposed in the base portion of the wishing well.

14. The invention of claim 4, wherein the coil includes a generally conical portion disposed in the roof portion of the wishing well.

15. The invention of claim 4, wherein the coil includes a generally cylindrical portion disposed in the base portion of the wishing well, further including a second coil of tubing disposed within roof portion of the wishing well, the second coil having a plurality of turns of tubing around and radially spaced from an axis forming a generally conical shape, the coils being disposed generally coaxially.

16. A method comprising the steps of:
(a) providing a coil of tubing, the coil having a plurality of turns of tubing around and radially spaced from an axis forming a helical shape with turns of tubing being axially displaced from adjacent turns of tubing;
(b) disposing the coil in a location receiving sunlight with the coil axis oriented generally vertically; and
(c) causing fluid to flow through the coil.

17. The invention of claim 16, wherein the fluid is water.

18. The invention of claim 17, further comprising the step of causing the water to flow into a swimming pool after flowing through the coil.

19. The invention of claim 17, further comprising the step of causing the water to flow into a tank after flowing through the coil.

20. The invention of claim 19, wherein the tank includes active water heating apparatus.

21. The invention of claim 19, wherein the tank is disposed within the coil.

22. The invention of claim 17, wherein the coil is thermally insulated.

23. The invention of claim 16, wherein:
step (a) further comprises providing a second coil of tubing, the second coil having an axis and the tubing of the coil being radially spaced from the axis;
step (b) further comprises disposing the second coil in a location receiving sunlight with the axis of the second coil oriented generally vertically; and
step (c) further comprises causing fluid to flow through the coil and through the second coil.

24. The invention of claim 23, wherein the coil and the second coil are disposed generally coaxially and are spaced apart along their axes.

25. The invention of claim 24, wherein the coil is disposed in the base portion and the second coil is disposed in the roof portion of a wishing well.

26. A method of making a solar collector for a solar water heating system comprising the steps of:
(a) providing a supply of flexible tubing and a frame;
(b) securing a portion of the tubing to the frame; and
(c) rotating the tubing supply and the frame relative to one another so as to dispose a portion of the tubing in successive turns around the frame to form a coil.

27. The invention of claim 26, wherein the rotating step (c) includes:
(c1) supporting the frame for rotation, and
(c2) rotating the frame with respect to the tubing supply.

28. The invention of claim 26, wherein the frame includes a tubular portion, and the rotating step (c) disposes the tubing around the tubular portion to form a helical coil.

29. The invention of claim 26, wherein the frame includes a tapering portion, and the rotating step (c) disposes the tubing around the tapering portion to form a spiral coil.

30. The invention of claim 29, wherein the frame includes a tubular portion, and the rotating step (c) disposes the tubing around the tubular portion to form a helical coil, further comprising the step of coupling the spiral coil to the helical coil so that fluid flowing through the helical coil also flows through the spiral coil.

31. The invention of claim 30, wherein the frame providing step includes providing a welded steel frame, the flexible tubing supplying step includes providing a supply of polymeric well pipe, the rotating step (c) includes supporting the frame for rotation and rotating the frame with respect to the tubing supply, further comprising the step of disposing the helical coil in the base portion and the spiral coil in the roof portion of a wishing well.

32. The invention of claim 26, further comprising the step of disposing the coil in a decorative structure.

33. The invention of claim 32, wherein the decorative structure is a wishing well having a base portion and a roof portion, the roof portion being supported above and spaced apart from the base portion, the coil being disposed within the base portion or the roof portion.

34. A solar water heating system comprising:
(a) a decorative structure; and
(b) a coil of tubing disposed within the decorative structure, the coil having a helical shape and being oriented with its axis disposed generally vertically, wherein the solar water heating system includes a base portion comprising a helical coil and a roof portion disposed above the base portion and comprising a spiral coil, the helical coil and the spiral coil being coupled so that water flowing through one coil will flow through the other coil.

35. The invention of claim 34, wherein the helical coil and the spiral coil are each disposed in an insulating structure that includes a transparent sheet disposed radially outwardly from the coil so that sunlight may pass through the sheet and impinge on the coil, wherein each coil comprises a length of polymeric well pipe wound around a welded steel frame, and wherein the structure is configured to permit sunlight to impinge on a radially outwardly disposed surface and a radially inwardly disposed surface of a coil.

36. The invention of claim 34, wherein the decorative structure is a wishing well.

37. A solar water heating system comprising:

(a) a decorative structure; and (b) a coil of tubing disposed within the decorative structure, the coil having a helical shape and being oriented with its axis disposed generally vertically, wherein the structure is configured to permit sunlight to impinge on a radially outwardly disposed surface and a radially inwardly disposed surface of the coil.

38. (new) A method of making a solar collector for a solar water heating system comprising the steps of:

(a) providing a supply of flexible tubing and a frame;

(b) securing a portion of the tubing to the frame; and (c) rotating the tubing supply and the frame relative to one another so as to dispose a portion of the tubing in successive turns around the frame to form a coil, wherein the frame includes a tubular portion, and the rotating step (c) disposes the tubing around the tubular portion to form a helical coil, further comprising the step of coupling the spiral coil to the helical coil so that fluid flowing through the helical coil also flows through the spiral coil.

39. The invention of claim 38, wherein the frame providing step includes providing a welded steel frame, the flexible tubing supplying step includes providing a supply of polymeric well pipe, the rotating step (c) includes supporting the frame for rotation and rotating the frame with respect to the tubing supply, further comprising the step of disposing the helical coil in the base portion and the spiral coil in the roof portion of a wishing well.

* * * * *